US011466702B2

(12) United States Patent
Fisher et al.

(10) Patent No.: US 11,466,702 B2
(45) Date of Patent: Oct. 11, 2022

(54) PUMP ASSEMBLY

(71) Applicant: Kickstart International, Inc., San Francisco, CA (US)

(72) Inventors: Martin John Fisher, San Francisco, CA (US); Alan Charles Spybey, Nairobi (KY); Simon Maina Mugo, Nairobi (KY)

(73) Assignee: Kickstart International, Inc., San Francisco, CA (US)

( * ) Notice: Subject to any disclaimer, the term of this patent is extended or adjusted under 35 U.S.C. 154(b) by 0 days.

(21) Appl. No.: 17/050,120

(22) PCT Filed: Apr. 16, 2019

(86) PCT No.: PCT/US2019/027605
§ 371 (c)(1),
(2) Date: Oct. 23, 2020

(87) PCT Pub. No.: WO2019/209577
PCT Pub. Date: Oct. 31, 2019

(65) Prior Publication Data
US 2021/0231130 A1 Jul. 29, 2021

Related U.S. Application Data

(60) Provisional application No. 62/662,504, filed on Apr. 25, 2018.

(51) Int. Cl.
*F04D 29/70* (2006.01)
*B01D 29/64* (2006.01)
(52) U.S. Cl.
CPC ....... *F04D 29/708* (2013.01); *B01D 29/6415* (2013.01)

(58) Field of Classification Search
CPC ........................ F04D 29/708; F04D 29/6415
(Continued)

(56) References Cited

U.S. PATENT DOCUMENTS 781,039 A * 1/1905 Weabe .................. B01D 29/05
210/414
786,549 A 4/1905 Dion
(Continued)

FOREIGN PATENT DOCUMENTS

CN 201823375 U 5/2011
CN 204025183 U 12/2014
(Continued)

OTHER PUBLICATIONS

International Search Report and Written Opinion for PCT/US2019/027605 dated Jul. 9, 2019.

*Primary Examiner* — Hung Q Nguyen
*Assistant Examiner* — Anthony Donald Taylor, Jr.
(74) *Attorney, Agent, or Firm* — Goodwin Procter LLP

(57) ABSTRACT

Improved systems and methods for cleaning a filter are described, including apparatuses that include a built-in mechanism for cleaning a filter screen. The system can include a brush mounted in contact with a filter screen, adapted so that the brush can be moved to clean the filter screen. In some versions, the brush rotates with an axis of rotation perpendicular to a plane defined by a substantially planar filter screen. In other versions, the brush is adapted to be moved by a gravitational force along a surface of a filter screen upon removal of a pump housing from a pump well. In still other versions, a substantially cylindrical brush is mounted nested with a substantially semi-cylindrical filter screen, and the brush can be rotated while in contact with the filter screen and with an axis of rotation aligned with a longitudinal axis of the filter screen.

17 Claims, 5 Drawing Sheets

(58) Field of Classification Search
USPC .................................................... 415/121.2
See application file for complete search history.

(56) References Cited

U.S. PATENT DOCUMENTS

| | | | | |
|---|---|---|---|---|
| 1,707,846 A * | 4/1929 | Corkran | ............ | B01D 29/6407 |
| | | | | 210/415 |
| 3,236,032 A | 2/1966 | Yasukawa et al. | | |
| 3,959,140 A * | 5/1976 | Legras | ................... | B01D 29/25 |
| | | | | 210/107 |
| 5,106,500 A * | 4/1992 | Hembree | ............ | B01D 29/117 |
| | | | | 210/266 |
| 5,714,065 A | 2/1998 | Huder | | |
| 6,155,430 A * | 12/2000 | Goodman | .......... | B01D 29/6446 |
| | | | | 210/355 |
| 6,598,263 B2 | 7/2003 | Boles et al. | | |
| 2007/0045168 A1* | 3/2007 | Levitt | ....................... | B04C 3/06 |
| | | | | 210/405 |
| 2013/0180902 A1* | 7/2013 | Frey | ................... | B01D 35/0276 |
| | | | | 210/121 |
| 2014/0050562 A1* | 2/2014 | Welte | ................... | F04D 15/0038 |
| | | | | 415/55.1 |
| 2017/0014736 A1* | 1/2017 | Osman Oguz | ....... | B01D 29/643 |
| 2017/0136391 A1* | 5/2017 | Crandall | ............... | E21B 27/005 |

FOREIGN PATENT DOCUMENTS

| | | |
|---|---|---|
| CN | 204891354 U | 12/2015 |
| CN | 205007681 U | 2/2016 |
| DE | 10246078 A1 | 4/2004 |

* cited by examiner

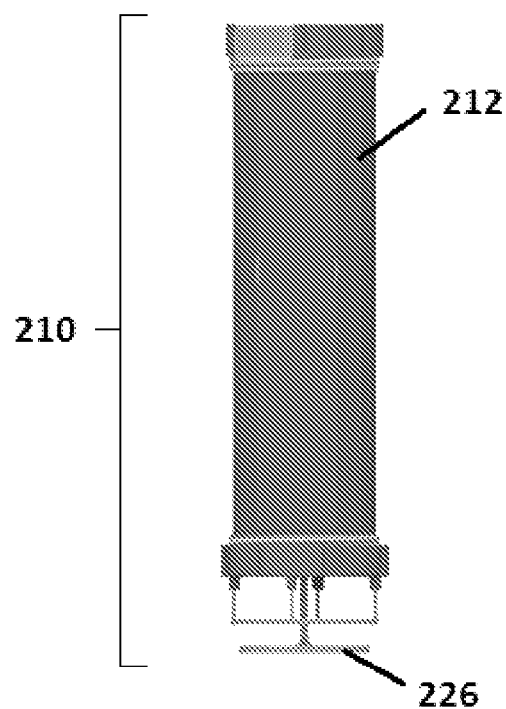
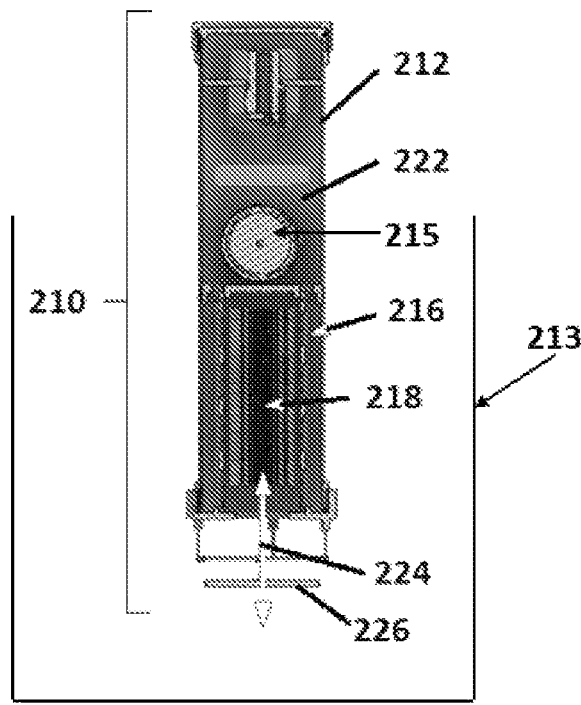
FIG. 2A FIG. 2B
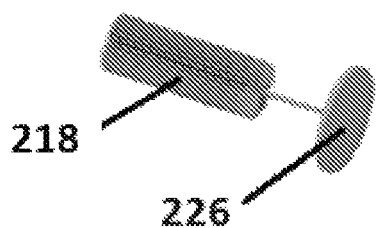
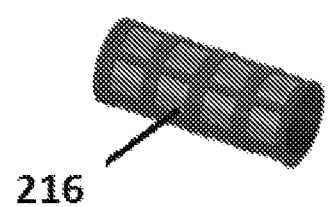
FIG. 2C FIG. 2D

| Feature | Min. value | Nominal value | Max. value | (units) |
|---|---|---|---|---|
| Pump assembly length | 75 | 150 | 1000 | mm |
| Pump assembly diameter | 25 | 125 | 300 | mm |
| Pump assembly weight | 100 | 2000 | 20000 | g |
| Pump assembly head | 2 | 20 | 100 | m |
| Pump assembly volumetric flow rate | .05 | 1 | 20 | l/s |
| Average pump input pump | 10 | 120 | 1000 | W |
| Average pump output power | 3 | 40 | 300 | W |
| Average pump efficiency | 10% | 30% | 80% | N/A |
| Filter screen length | 10 | 75 | 200 | mm |
| Filter screen diameter | 10 | 30 | 200 | mm |
| Filter pore size (diameter) | 0.2 | 0.7 | 2 | mm |
| Brush length | 5 | 30 | 60 | mm |
| Brush diameter | 25 | 75 | 200 | mm |
| Brush bristle density | 5 | 10 | 40 | bristles/cm |

FIG. 4

PUMP ASSEMBLY

CROSS-REFERENCE TO RELATED APPLICATION

This application is a national stage entry under 35 U.S.C. § 371(b) of International Application No. PCT/US2019/027605, filed on Apr. 16, 2019, which claims benefit of, and priority to, U.S. Provisional Application No. 62/662,504 entitled "PUMP ASSEMBLY" filed on Apr. 25, 2018, the contents of each of which are hereby incorporated by reference in their entirety.

TECHNICAL FIELD

The invention relates generally to filter cleaning techniques and, more particularly, to apparatuses that include a built-in mechanism for cleaning a filter screen.

BACKGROUND

Many systems in use today rely on filters. A filter can be used to keep the system free of debris or unwanted material, and/or to remove unwanted materials from a stream of liquid, gas, or other desired substance that passes through the system. An issue common to most filters is that eventually an excessive amount of unwanted material will accumulate on a surface of the filter, clogging the filter so the filtered substance passes through the system too slowly or not at all. The filter can be fine or coarse and generally the finer the filter the more unwanted material will accumulate on a surface of the filter. Accumulated debris on the filter reduces the efficiency of the system to move the desired substance and can cause damage to components, such as pumps, fans, and associated motors which may be found in such systems. Therefore, keeping the filter clean is vital.

Cleaning of filters typically requires removing unwanted material from the filter surface by mechanical methods and/or by directing a fluid flow at or through the filter. In conventional use, cleaning the filter generally requires use of a separate tool, that can be difficult for the user to apply to the filter. Frequently, cleaning the filter also involves removal of the filter from the system and then reinstallation of the filter after cleaning. These techniques are not optimal, as they make the cleaning of the filter inconvenient and, as a result, many users will clean the filter less often than required for optimal system performance or not at all. Thus, an improved technique for cleaning a filter is needed.

SUMMARY

Accordingly, the present disclosure describes improved pump assemblies having a filter screen and a built-in mechanism for cleaning the filter screen. In some embodiments, the pump assembly may be used as a submersible pump. In various embodiments, the pump assembly can be used to pump water from wells or sumps.

In one aspect, the invention relates to a pump. The pump may include a pump housing adapted to contain a pumping unit, a substantially planar fixed filter screen mounted inside the pump housing, and a manually-operated brush mounted adjacent to the filter screen, where the brush may be adapted to rotate while in contact with the filter screen and with an axis of rotation perpendicular to a plane defined by the filter screen.

In some embodiments of the above aspect, the pump housing may have a cylindrical shape, a rectangular shape, and/or a sectorial shape. In some embodiments, the pump housing is cylindrical. In some instances, the fixed filter screen is at least one of circular and disc-shaped. In some instances, the filter screen includes an exposed surface and the brush can be adapted to rotate to contact at least 90% of the exposed surface during rotation. In some cases, the pumping unit can be an electric (DC) pump, a brushless (DC) pump, a rotary pump, a centrifugal pump, a positive displacement pump, a reciprocating pump, and/or combinations thereof. The manually-operated brush may be adapted to rotate within a circumferential track formed by the pump housing. In some versions, the manually-operated brush can be further adapted to translate parallel to the filter screen plane.

In another aspect, the invention relates to a method for cleaning a filter. The method can include the steps of: (a) obtaining a pump having: a pump housing adapted to contain a pumping unit, a substantially planar fixed filter screen mounted inside the pump housing, and a manually-operated brush mounted adjacent to the filter screen wherein the brush is adapted to rotate while in contact with the filter screen and with an axis of rotation perpendicular to a plane defined by the filter screen; and (b) manually rotating the brush to clean the filter screen. In some instances, the manually-operated brush can be adapted to rotate within a circumferential track formed by the pump housing.

In another aspect, the invention relates to a pump having a different configuration. The pump can include a pump housing adapted to be placed in a pump well and to contain a pumping unit, a fixed filter screen mounted inside the pump housing, and a brush mounted adjacent to the filter screen, in which the brush is adapted to be moved by a gravitational force along a surface of the filter screen upon removal of the pump housing from the pump well.

In some embodiments of this aspect, the pump housing may have a cylindrical shape, a rectangular shape, and/or a sectorial shape. In various instances, any of the pump housing, the fixed filter screen, and the brush can be cylindrical. In some cases, the brush is nested within the filter screen. In some embodiments, the brush is arranged concentrically with the filter screen. In some embodiments, the brush is adapted to be moved axially in a longitudinal direction along a surface of the filter screen. In some instances, the pump may include a weighted component attached to the brush, the weighted component adapted to move by the gravitational force and thereby move the brush along the surface of the filter screen upon removal of the pump housing from the pump well. In some versions, the brush can be further adapted to rotate while in contact with the filter screen.

In another aspect, the invention relates to another method for cleaning a filter. The method can include the steps of: (a) obtaining a pump having: a pump housing adapted to be placed in a pump well and to contain a pumping unit, a fixed filter screen mounted inside the pump housing, and a brush mounted adjacent to the filter screen, wherein the brush is adapted to be moved by a gravitational force along a surface of the filter screen upon removal of the pump housing from the pump well; and (b) removing the pump housing from the pump well to clean the filter screen. In some instances, the fixed filter screen can be cylindrical, the brush can be cylindrical, and the brush can be adapted to be moved axially in a longitudinal direction along a surface of the filter screen. In some cases, the pump can include a weighted component attached to the brush, the weighted component adapted to move by the gravitational force and thereby move the brush along the surface of the filter screen upon removal of the pump housing from the pump well.

In another aspect, the invention relates to a pump having yet another configuration. The pump can include a pump housing adapted to contain a pumping unit, a substantially semi-cylindrical fixed filter screen mounted inside the pump housing, and a manually-operated brush mounted nested with the filter screen, where the brush is adapted to rotate while in contact with the filter screen and with an axis of rotation aligned with a longitudinal axis of the filter screen. In some embodiments of this aspect, the pump housing may have a cylindrical shape, a rectangular shape, and/or a sectorial shape. In some embodiments, the filter screen includes a convex face and a concave face and the brush is adapted to rotate while in contact with the concave face. In some instances, the filter screen has an exposed surface and the brush is adapted to rotate to contact at least 90% of the exposed surface during rotation. The pumping unit can be an electric (DC) pump, a brushless (DC) pump, a rotary pump, a centrifugal pump, a positive displacement pump, a reciprocating pump, and/or combinations thereof. In some cases, the brush can be substantially cylindrical. In some embodiments, the brush, when not in use, does not project beyond the pump housing. In some embodiments, the brush has a length aligned with the axis of rotation, the filter screen has a length aligned with the longitudinal axis of the filter screen, and the length of the brush can be less than the length of the filter screen. In some versions of the pump where the length of the brush is less than the length of the filter screen, the brush can be further adapted to translate in a direction aligned with the longitudinal axis of the filter screen. In some cases, translation of the brush can allow inspection of the filter screen.

In another aspect, the invention relates to another method for cleaning a filter. The method can include the steps of: (a) obtaining a pump having: a pump housing adapted to contain a pumping unit, a substantially semi-cylindrical fixed filter screen mounted inside the pump housing, and a manually-operated brush mounted nested with the filter screen, wherein the brush is adapted to rotate while in contact with the filter screen and with an axis of rotation aligned with a longitudinal axis of the filter screen; and (b) manually rotating the brush to clean the filter screen. In some embodiments, the brush can be substantially cylindrical. In some versions, the brush has a length aligned with the axis of rotation, the filter screen has a length aligned with the longitudinal axis of the filter screen, the length of the brush can be less than the length of the filter screen, and the brush can be further adapted to translate in a direction aligned with the longitudinal axis of the filter screen.

BRIEF DESCRIPTION OF THE FIGURES

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings in which:

FIG. 2A is a schematic front view of another pump assembly, according to various embodiments;

FIG. 2B is a schematic front cut-away view of the pump assembly shown in FIG. 2A, according to various embodiments;

FIG. 2C is a schematic perspective view of a brush, according to various embodiments;

FIG. 2D is a schematic perspective view of a filter screen, according to various embodiments;

FIG. 4 is a chart listing example parameters for pump assemblies, according to various embodiments.

DETAILED DESCRIPTION

Figure 1A:
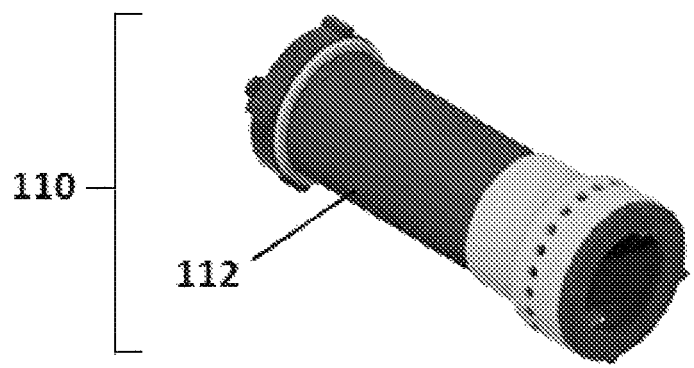
FIG. 1A is a schematic perspective view of a pump assembly, according to various embodiments.

Embodiments of the present invention relate to improved techniques for cleaning a filter (e.g., removing debris therefrom). This disclosure will generally describe the filter cleaning techniques and apparatus applied to filters incorporated within submersible pumps; however, in general, the techniques described herein are adaptable for use with any filter screen in other environments as well, e.g., HVAC systems, automotive systems, laundry units, desalination and other water purification systems, among many others. In some embodiments, the invention relates to an improved pump assembly with a filter screen and a built-in mechanism for cleaning the filter screen. In some instances, as shown for example in FIGS. 1A and 1B, the pump assembly 110 includes a generally cylindrical pump housing 112. In other embodiments, the pump housing can take other shapes, e.g., rectangular, sectorial, etc. In general, the pump housing 112 may take on any shape to facilitate installation of the pump assembly in a well borehole or other location, as may be desired or suitable in various environments and applications.

In some embodiments the pump housing 112 may include an elongate hollow shell or outer casing that is adapted to provide a watertight, or substantially watertight inner chamber 122 for accommodating the pumping unit (which may include, e.g., a pump, a pump motor, electrical wiring, etc.). The pumping unit may be, e.g., an electric (DC) pump, a brushless (DC) pump, a rotary pump, a centrifugal pump, a positive displacement pump, a reciprocating pump, and/or combinations thereof. The pump housing 112 may be configured as a single shell that provides protection from exterior loads as well as a pressurized inner chamber 122. Alternatively, the pump housing 112 may be configured with multiple shells, e.g., double-shelled, that include, for example, an inner, pressurized shell for accommodating the pumping unit and an outer shell for external protection.

Figure 1B:
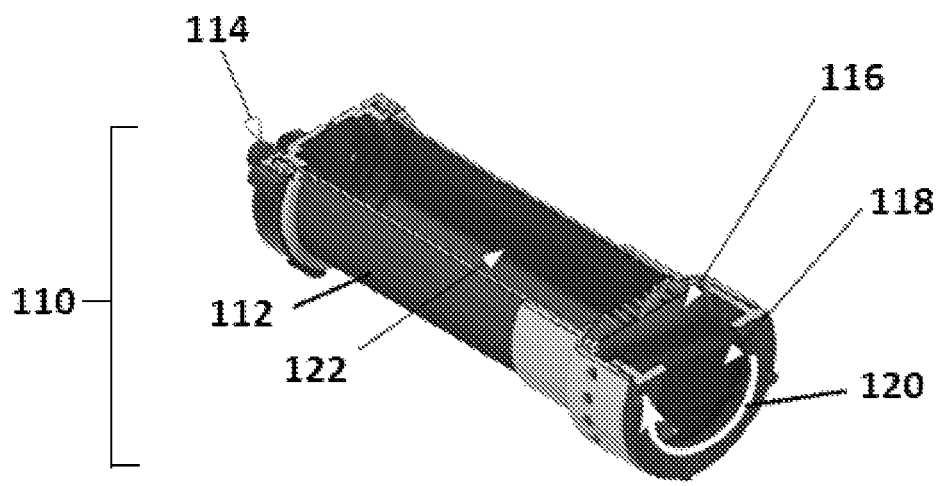
FIG. 1B is a schematic perspective cut-away view of the pump assembly shown in FIG. 1A, according to various embodiments.

As shown in FIG. 1B, the pump assembly 110 may include a pressurized output port 114, from which water is ejected by the pump assembly 110. In some embodiments, the port 114 may be at one end of a cylindrical pump housing 112 on a substantially planar face of the cylinder. In other embodiments, the port 114 may be, for example, on a curved surface of the cylinder, and may be near one end of the curved surface, in proximity to a substantially planar face. In some cases, a tube or hose may be connected to the port 114 to guide the pressurized liquid to a desired location.

The pump assembly 110 may also include a substantially planar filter screen 116. In some embodiments the filter screen 116 may be circular or disc-shaped. As shown in FIG. 1B, in some cases where the pump housing 112 is cylindrical, the filter screen 116 may be circular or disc-shaped and may be oriented concentrically with the circular cross-section of the pump housing 112. The filter screen 116 may be made of metal (e.g., stainless steel), polymer (e.g., nylon, polypropylene), carbon fiber, ceramic materials, natural fibers (e.g., cellulose), composite materials, etc. The filter screen 116 may be a single unit with perforations, or it may be composed of multiple pieces, such as fibers or strands, which may form a woven or non-woven mesh screen. In some cases, the filter screen 116 may be a stainless steel disc with perforations. In some cases, the filter screen 116 may be a stainless steel mesh disc.

The filter screen 116 may be located at one end of the pump assembly 110, such that incoming liquid passes through the filter screen, and so that solid particles in the incoming liquid can be removed from the liquid before entering the inner chamber 122 containing the pumping unit. In some embodiments the filter screen 116 may be located at the end of the pump assembly 110 that is opposite to the end in which the port 114 is located.

The filter screen 116 may have an exposed surface and an interior surface that are on opposite sides of the substantially planar filter screen 116. The exposed surface may be exposed to the incoming liquid with particles, such that the particles are retained on the exposed surface of the filter screen 116.

The pump assembly 110 may include a manually-operated brush 118 disposed adjacent to the filter screen 116. The brush 118 may be adapted to rotate while in contact with the filter screen 116 and with an axis of rotation perpendicular to a plane defined by the filter screen 116, resulting in a direction of rotation 120. The rotation of the brush 118 in contact with the filter screen 116 may remove particles from the filter screen 116. The brush 118 may be made of metal (e.g., stainless steel), polymer (e.g., nylon, polypropylene), carbon fiber, ceramic materials, natural fibers (e.g., cellulose), composite materials, etc. In some embodiments, the brush 118 may be a stainless steel wire brush.

In some embodiments, the manually operated brush 118 may be operated manually with a turning mechanism which may be a lever, handle, knob, etc. that is operatively connected to the brush 118. In some instances, the turning mechanism may be located externally on the pump assembly 110, so that a user may access the turning mechanism from the exterior of the pump assembly 110 without needing to open the pump assembly 110. In some cases, the turning mechanism may be a knob located on the exterior of the pump assembly 110. In some cases, the turning mechanism may be located internally in the pump assembly 110, so that a user must open the pump assembly 110 to access the turning mechanism. In some instances the turning mechanism may be detachable, and may be removed when the pump assembly 110 is in use, then may be re-attached when the user desires to clean the filter screen 116.

In some embodiments the brush 118 may be adapted to rotate to contact at least 50%, at least 60%, at least 70%, at least 80%, or at least 90% of a surface of the filter screen 116 during rotation. In some embodiments, the brush 118 may be adapted to rotate in contact with the exposed surface of the filter screen 116. The brush 118 may be adapted to rotate to contact at least 90% of the exposed surface of the filter screen 116 during rotation. In some embodiments, the brush 118 may be adapted to rotate in contact with the interior surface of the filter screen 116. In some cases the brush 118 may be adapted to rotate to contact at least 90% of the interior surface of the filter screen 116 during rotation.

In some embodiments, the rotation of the brush 118 in contact with the filter screen 116 may be performed in conjunction with movement of liquid over or through the filter screen 116. This movement of liquid may be over the exposed surface of the filter screen 116 (e.g., rinsing) or through the filter screen 116 in a direction from the interior side to the exposed side (e.g., back flushing).

In some embodiments, the brush 118 may be adapted to rotate within a circumferential track formed by the pump housing 112. Because the brush 118 is captured in the track and retained as part of the pump assembly 110, the brush 118 is readily accessible for filter cleaning. In some versions of the foregoing embodiments, the pump housing 112 may be cylindrical and the filter screen 116 may be circular or disc-shaped.

In some versions, the brush 118 can have a length $L_1$ aligned parallel to the plane defined by the filter screen 116, and the filter screen 116 can have a length $L_2$ aligned parallel to the plane defined by the filter screen 116, and the length $L_1$ of the brush 118 can be less than the length $L_2$ of the filter screen 116. In some embodiments, $L_1$ can be about 20%, about 30%, about 40%, about 50%, about 60%, or about 70% of $L_2$. In some versions where $L_1$ is less than $L_2$, the brush 118 can be further adapted to translate parallel to the plane defined by the filter screen 116. Translation of the brush 118 can allow an additional mode of cleaning, and can allow inspection of the filter screen 116 by exposing a visible portion of the filter screen.

In yet other instances, the brush 118 can be translated back and forth along the surface of the filter screen 116 by manually shaking the pump assembly 110 in an appropriate direction. Translation of the brush 118 by shaking can also be effective in other aspects, such as aspects that do not require the brush 118 to be adapted to rotate.

In some instances the pump assembly 110 may be adapted to be used in a well, borehole, or sump. In some instances the liquid pumped by the pump assembly 110 may be water.

Another example filter cleaning apparatus is illustrated in FIGS. 2A through 2D, which depict a pump assembly 210 having a pump housing 212 that is adapted to be placed in a pump well 213 and to contain a pumping unit 215. In some instances, the pump assembly 210 includes a cylindrical pump housing 212. In other embodiments, the pump housing can take other shapes, e.g., rectangular, sectorial, etc. The pump housing 212 may take on any shape to facilitate installation of the pump assembly in a well, borehole, or sump.

In some embodiments of this aspect, as shown in FIGS. 2A and 2B, the pump housing 212 may include an elongate hollow shell or outer casing that is adapted to provide a watertight, or substantially watertight inner chamber 222 for accommodating the pumping unit (which may include, e.g., a pump, a pump motor, electrical wiring, etc.). The pumping unit may be, e.g., an electric (DC) pump, a brushless (DC) pump, a rotary pump, a centrifugal pump, a positive displacement pump, a reciprocating pump, and/or combinations thereof. The pump housing 212 may be configured as a single shell that provides protection from exterior loads as well as a pressurized inner chamber 222. Alternatively, the pump housing 212 may be configured with multiple shells, e.g., double-shelled, that include, for example, an inner, pressurized shell for accommodating the pumping unit and an outer shell for external protection.

The pump assembly 210 may also include a fixed filter screen 116 mounted inside the pump housing 212. In some versions the filter screen 216 may be substantially flat, and may have a shape chosen from circular, oval, rectangular, square, etc. In some versions, the filter screen 216 may be a shape other than substantially flat, for example, it may be concave, convex, arcuate, semi-cylindrical, cylindrical, etc. As shown in FIGS. 2B and 2D, in some embodiments the filter screen 216 is cylindrical. In some embodiments, the pump housing 212 may be cylindrical and the cylindrical filter screen 216 may be oriented concentrically with the cylindrical pump housing 212. The filter screen 216 may be made of metal (e.g., stainless steel), polymer (e.g., nylon, polypropylene), carbon fiber, ceramic materials, natural fibers (e.g., cellulose), composite materials, etc. The filter screen 216 may be a single unit with perforations, or it may be composed of multiple pieces, such as fibers or strands, which may form a woven or non-woven mesh screen. In some cases the filter screen 216 may be a stainless steel cylinder with perforations. In some cases the filter screen 216 may be a stainless steel mesh cylinder.

The filter screen 216 may be located at one end of the pump assembly 200, such that incoming liquid can pass through the filter screen, and so that solid particles in the incoming liquid can be removed from the liquid before entering the inner chamber 222 containing the pumping unit. The filter screen 216 may have an exposed surface and an interior surface which are on opposite sides of the filter screen 216. The exposed surface may be exposed to the incoming liquid with particles, and the particles may be retained on the exposed surface of the filter screen 216.

The pump assembly 210 may include a brush 218 mounted adjacent to the filter screen 216, where the brush may be adapted to be moved by a gravitational force along a surface of the filter screen upon removal of the pump housing from the pump well. Such an arrangement can enable the filter to be automatically cleaned upon removal of the pump assembly 210 from a well. For example, as the pump assembly is suspended within the well, gravity can act to translate the brush 218 along a surface of the filter screen. The brush 218 may be adapted to be moved axially in a longitudinal direction along a surface of the filter screen. The brush 218 may be moved along and in contact with a surface of the filter screen 216, and the movement of the brush 218 along a surface of the filter screen 216 may remove particles from the filter screen 216. In other instances, upon removal of the pump assembly 210 from the well, the brush 218 can be manually translated back and forth along the surface of the filter screen 216 as indicated by arrow 224.

In yet other instances, the brush 218 can be translated back and forth along the surface of the filter screen 216 by manually shaking the pump assembly 210 in an appropriate direction. Translation of the brush 218 by shaking can also be effective in other aspects, such as aspects that do not require the brush 218 to be moved by a gravitational force, and such aspects can allow the brush 218, and a weighted component 226, if present, to be housed completely within the pump housing 210. Translation of the brush 218 can allow an additional mode of cleaning, and can allow inspection of the filter screen 216 by exposing a visible portion of the filter screen. Alternatively, the brush 218 can be manually rotated while in contact with the surface of the filter screen 216. In some versions, the brush 218 cannot be rotated, but only translated back and forth in a linear direction. In some versions, the brush can be translated back and forth in a linear direction, and can also be rotated. In some embodiments, the brush 218 may be cylindrical, as shown in FIG. 2C. In some cases, the filter screen 216 may be cylindrical. In some cases the brush 218 may be nested within the filter screen 216. In some cases the brush 218 may be arranged concentrically within the filter screen 216. In some embodiments, as shown in FIG. 2B, the brush 218 may be cylindrical and may be arranged concentrically within a cylindrical filter screen 216.

In some cases, the brush 218 can have a length $L_1$ aligned with the longitudinal axis of the filter screen 216, and the filter screen 216 can have a length $L_2$ aligned with the longitudinal axis of the filter screen 216, and the length $L_1$ of the brush 218 can be less than the length $L_2$ of the filter screen 216. In some embodiments, $L_1$ can be about 20%, about 30%, about 40%, about 50%, about 60%, or about 70% of $L_2$.

The brush 218 may be made of metal (e.g., stainless steel), polymer (e.g., nylon, polypropylene), carbon fiber, ceramic materials, natural fibers (e.g., cellulose), composite materials, etc. In some embodiments, the brush 218 may be a stainless steel wire brush.

In some embodiments the brush 218 may be adapted to move (e.g., translate and/or rotate) to contact at least 50%, at least 60%, at least 70%, at least 80%, or at least 90% of a surface of the filter screen 216 during movement (e.g., translation and/or rotation). In some embodiments, the brush 218 may be adapted to move while in contact with the exposed surface of the filter screen 216. In some cases, the brush 218 may be adapted to move to contact at least 90% of the exposed surface of the filter screen 216 during movement. In some embodiments, the brush 218 may be adapted to move while in contact with the interior surface of the filter screen 216. In some cases the brush 218 may be adapted to move to contact at least 90% of the interior surface of the filter screen 216 during movement.

In some embodiments, rather than the brush acting during removal of the pump from the well, motion of the brush 218 in contact with the filter screen 216 may be performed in conjunction with movement of liquid over or through the filter screen 216. This movement of liquid may be over the exposed surface of the filter screen 216 (e.g., rinsing) or through the filter screen 216 in a direction from the interior side to the exposed side (e.g., back flushing).

In some embodiments, the brush 218 may further include a weighted component 226 attached to the brush 218. The weighted component 226 can be an element that is acted on by the gravitational force and thereby moves the brush along the surface of the filter screen upon removal of the pump housing from the pump well. The weighted component 226 may be of a variety of shapes, and may be spherical, ellipsoid, cubical, conical, T-shaped, a D-shaped handle, star-shaped, plate-shaped, etc. In some versions, the weighted component 226 may be plate-shaped, and the plate may be in the shape of a square, hexagon, circle, etc. In some cases, the weighted component 226 is shaped like a screw or helix to allow it to be fixed or anchored in the ground when the pump is inserted into a borehole. In some embodiments, as shown in FIG. 2C, the weighted component 226 is a circular plate or disc. The weighted component 226 may be made of metal (e.g., stainless steel), polymer (e.g., nylon, polypropylene), ceramic materials, natural materials (e.g., wood, stone), concrete, composite materials, etc. The weighted component 226 may be made of the same material as the brush 218, or may be made of different material. In some versions, the weighted component 226 may be made of metal.

In some instances, the weighted component 226 may be attached to the brush 218 by a rigid connector, such as a rod, bolt, screw, etc. In some instances, the weighted component 226 may be attached to the brush 218 by a flexible connector, such as a rope, cable, chain, wire, hinged or articulated rod, etc. In some embodiments, as shown in FIG. 2C, the weighted component 226 is connected to the brush 218 by a rigid rod connector. In some versions, the weighted component 226 is not supplied with the pump assembly 210, but is supplied by a user and is attached to an attachment point on the brush 216, or attached to a connector which is itself attached to the brush 216. For example, the attachment point may be a ring bolt or D-ring attached to the brush 218, and a weighted component 226 may be attached to the attachment point by a connector which is a rope, cable, chain, etc.

In some versions, the movement of the brush 218 and/or the weighted component 226 may be arrested by an arresting device which may be integrated into the pump housing 212 and brush 218, such that the brush 218 does not pull completely out of the pump assembly 210 when the brush 218 is moved by the gravitational force. The arresting device may include a first protrusion, such as a lip, flange, knob, etc., in the pump housing 212 that engages a second protrusion on the brush 218, thus preventing the brush from being pulled completely out of the pump assembly 210.

In some instances the pump assembly 210 may be adapted to be used in a well, borehole, or sump. In some instances the liquid pumped by the pump assembly 210 may be water.

Figure 3A:
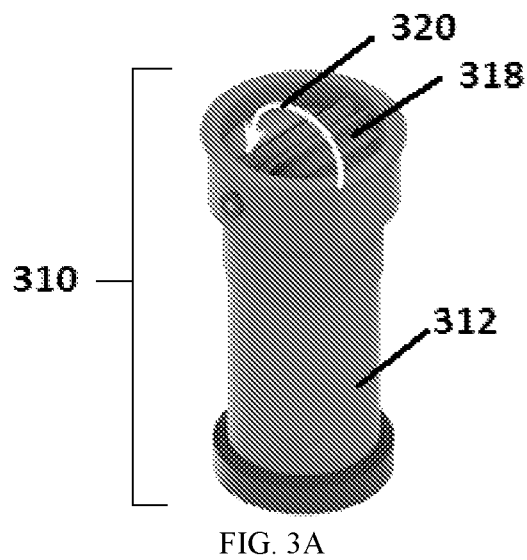
FIG. 3A is a schematic perspective view of yet another pump assembly, according to various embodiments.
Figure 3B:
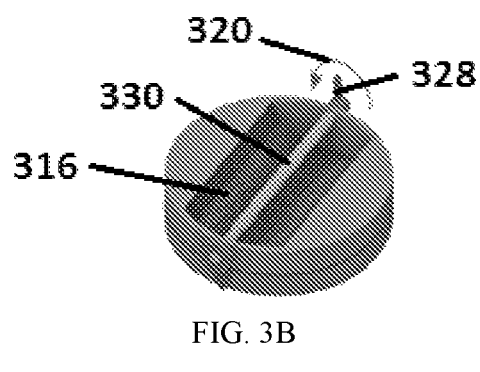
FIG. 3B is a schematic perspective view of a filter screen and associated components according to various embodiments.
Figure 3C:
FIG. 3C is a schematic perspective view of another brush, according to various embodiments.

Another example filter cleaning apparatus is illustrated in FIGS. 3A through 3C, which depict a pump assembly 310 having a pump housing 312 which is adapted to be placed in a pump well and to contain a pumping unit. In some instances, the pump assembly 310 includes a generally cylindrical pump housing 312. In other embodiments, the pump housing can take other shapes, e.g., rectangular, sectorial, etc. The pump housing 312 may take on any shape to facilitate installation of the pump assembly in a well, borehole, or sump.

In some embodiments of this aspect, as shown in FIGS. 3A and 3B, the pump housing 312 may include an elongate hollow shell or outer casing that is adapted to provide a watertight, or substantially watertight inner chamber for accommodating the pumping unit (which may include, e.g., a pump, a pump motor, electrical wiring, etc.). The pumping unit may be, e.g., an electric (DC) pump, a brushless (DC) pump, a rotary pump, a centrifugal pump, a positive displacement pump, a reciprocating pump, and/or combinations thereof. The pump housing 312 may be configured as a single shell that provides protection from exterior loads as well as a pressurized inner chamber. Alternatively, the pump housing 312 may be configured with multiple shells, e.g., double-shelled, that include, for example, an inner, pressurized shell for accommodating the pumping unit and an outer shell for external protection.

The pump assembly 310 may also include a fixed filter screen 316 mounted inside the pump housing 312. As shown in FIG. 3B, which depicts an isolated filter portion of the full pump assembly 310 shown in FIG. 3A, in some versions the filter screen 316 is substantially semi-cylindrical. In FIG. 3A the filter screen 316 cannot be seen, but would be located under the brush 318. As used herein, "semi-cylindrical" means the shape of some portion of a curved surface of a cylinder, in which the cylinder has been cut along its longitudinal axis. For example, a semi-cylindrical filter screen 316 may have a shape which is about 10%, 20%, 30%, 40%, 50%, or 60% of a curved surface of a cylinder. In some embodiments, the filter screen 316 may be semi-cylindrical and may have a shape which is about 50% of a curved surface of a cylinder. In some cases, the substantially semi-cylindrical filter screen 316 may have the same or similar curvature throughout. In some cases, the substantially semi-cylindrical filter screen 316 may have curvature that varies through a curved cross-section. In some embodiments the filter screen 316 may be substantially semi-cylindrical, the pump housing 312 may be cylindrical, and the filter screen 316 may be mounted on one end of the pump housing 312. In some cases the filter screen 316 may be substantially semi-cylindrical, the pump housing 312 may be cylindrical, and the filter screen 316 may be mounted, such that a longitudinal axis of the filter screen 316 is orthogonal to a longitudinal axis of the pump housing 312 (see, e.g., FIGS. 3A and 3B).

The filter screen 316 may be made of metal (e.g., stainless steel), polymer (e.g., nylon, polypropylene), carbon fiber, ceramic materials, natural fibers (e.g., cellulose), composite materials, etc. The filter screen 316 may be a single unit with perforations, or it may be composed of multiple pieces, such as fibers or strands, which may form a woven or non-woven mesh screen. In some cases the filter screen 316 may be a stainless steel semi-cylinder with perforations. In some cases the filter screen 316 may be a stainless steel mesh semi-cylinder.

The filter screen 316 may be located at one end of the pump assembly 310, such that incoming liquid can pass through the filter screen, and so that solid particles in the incoming liquid can be removed from the liquid before entering the inner chamber containing the pumping unit. The filter screen 316 may have an exposed surface and an interior surface which are on opposite sides of the filter screen 316. The exposed surface may be exposed to the incoming liquid with particles, and the particles may be retained on the exposed surface of the filter screen 316. In some embodiments, the filter screen 316 may include a convex face, and a concave face which is opposite the convex face. In some cases, the exposed surface of the filter screen 316 is the concave face.

The pump assembly 310 may include a manually-operated brush 318 disposed adjacent to the filter screen 316. In some embodiments, the brush 318 may be substantially cylindrical, as shown in FIG. 3C. The brush 318 may be nested within the filter screen 316, and may be adapted to rotate while in contact with the filter screen 316 and with an axis of rotation 330 aligned with a longitudinal axis of the filter screen 316, resulting in a direction of rotation 320, as shown in FIGS. 3A and 3B. The rotation of the brush 318 in contact with the filter screen 316 may remove particles from the filter screen 316. The brush 318 may be made of metal (e.g., stainless steel), polymer (e.g., nylon, polypropylene), carbon fiber, ceramic materials, natural fibers (e.g., cellulose), composite materials, etc. In some embodiments, the brush 318 may be a stainless steel wire brush.

Figure 3D:
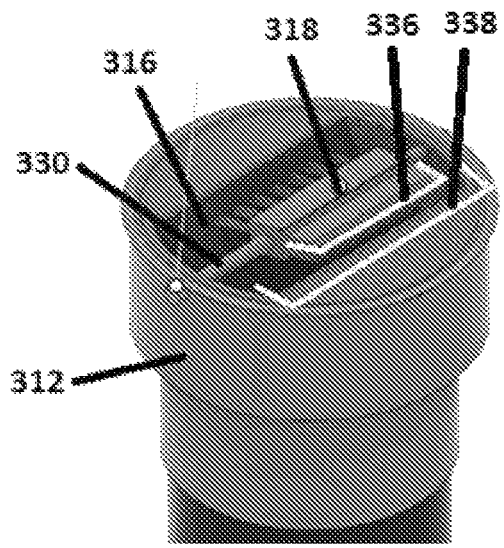
FIG. 3D is a schematic perspective view of another configuration of brush, filter screen, and associated components, according to various embodiments.
Figure 3E:
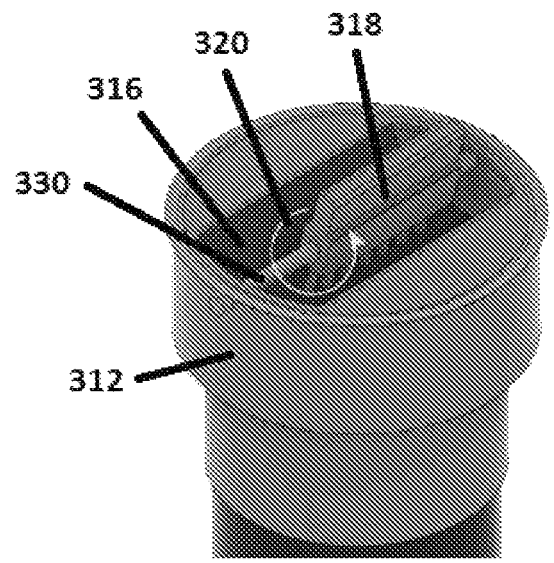
FIG. 3E is another schematic perspective view of the configuration shown in FIG. 3D, according to various embodiments.
Figure 3F:
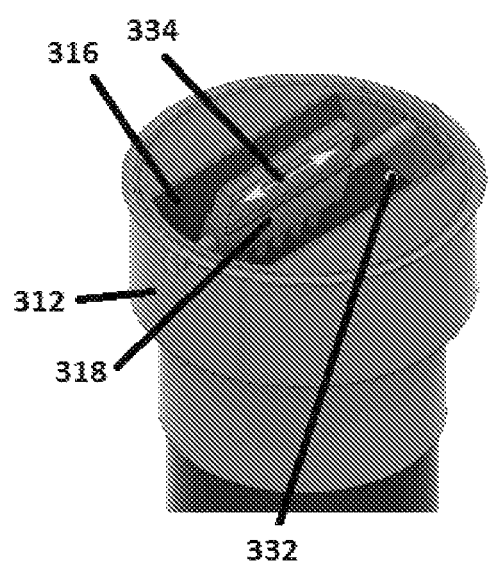
FIG. 3F is yet another perspective schematic view of the configuration shown in FIG. 3D, according to various embodiments.

In some embodiments, the manually operated brush 318 may be operated manually with of a turning mechanism 328 which may be a lever, handle, knob, etc. In some instances, the turning mechanism may be located externally on the pump assembly 310, so that a user may access the turning mechanism 328 from the exterior of the pump assembly 310 without needing to open the pump assembly 310. In some cases, the turning mechanism 328 may be a knob located on the exterior of the pump assembly 310. In some cases, the turning mechanism 328 may be located internally in the pump assembly 310, so that a user must open the pump assembly 310 to access the turning mechanism 328. In some instances the turning mechanism 328 may be detachable, and may be removed when the pump assembly 310 is in use, then may be re-attached when the user desires to clean the filter screen 316. In some embodiments, as shown in FIGS. 3D, 3E, and 3F, the brush 318, when not in use, does not project beyond the pump housing 312. In some versions, as shown in FIG. 3E, portions of the brush 318 may extend beyond the pump housing 312 when the brush 318 is being rotated in direction of rotation 320 and is being used to clean the filter screen 316. In some versions, the brush 318 can have a length $L_1$ 336 aligned with the axis of rotation 330, the filter screen 316 can have a length $L_2$ 338 aligned with the longitudinal axis of the filter screen 316, and the length $L_1$ 336 of the brush 318 can be less than the length $L_2$ 338 of the filter screen 316, as shown in FIG. 3D. In some embodiments, $L_1$ 336 can be about 20%, about 30%, about 40%, about 50%, about 60%, or about 70% of $L_2$ 338. In some cases in which $L_1$ 336 is less than $L_2$ 338, the brush 318 can be further adapted to translate back and forth along the surface of the filter screen 316 in a direction of movement 334 aligned with the longitudinal axis of the filter screen 316, as shown in FIG. 3F. Translation of the brush 318 can allow an additional mode of cleaning, and can allow inspection of the filter screen 316 by exposing a visible portion of the filter screen 332.

In yet other instances, the brush 318 can be translated back and forth along the surface of the filter screen 316 by manually shaking the pump assembly 310 in an appropriate direction. Translation of the brush 318 by shaking can also be effective in other aspects, such as aspects that do not require the brush 318 to be adapted to rotate.

In some embodiments, the brush 318 may be adapted to move (e.g., rotate and/or translate) in contact with at least 50%, at least 60%, at least 70%, at least 80%, or at least 90% of a surface of the filter screen 316 during movement (e.g., rotation and/or translation). In some embodiments, the brush 318 may be adapted to move in contact with the exposed surface of the filter screen 316. In some cases, the brush 318 may be adapted to move in contact with at least 90% of the exposed surface of the filter screen 316 during movement. In some embodiments, the brush 318 may be adapted to move in contact with the interior surface of the filter screen 316. In some cases the brush 318 may be adapted to move in contact with at least 90% of the interior surface of the filter screen 316 during movement. In some embodiments, the brush 318 may be adapted to move in contact with a concave face of the filter screen 316, which face may be either the exposed or interior surface. In some embodiments, the brush 318 may be adapted to move in contact with a concave face of the filter screen 316, and the concave face may be the exposed surface.

In some embodiments, the movement of the brush 318 in contact with the filter screen 316 may be performed in conjunction with movement of liquid over or through the filter screen 316. This movement of liquid may be over the exposed surface of the filter screen 316 (e.g., rinsing) or through the filter screen 316 in a direction from the interior side to the exposed side (e.g., back flushing).

In some instances the pump assembly 310 may be adapted to be used in a well, borehole, or sump. In some instances the liquid pumped by the pump assembly 310 may be water.

Example minimum, maximum, and nominal values for various structural and operational parameters relating to various pump assemblies described herein are shown in FIG. 4.

Each numerical value presented herein is contemplated to represent a minimum value or a maximum value in a range for a corresponding parameter. Accordingly, when added to the claims, the numerical value provides express support for claiming the range, which may lie above or below the numerical value, in accordance with the teachings herein. Absent inclusion in the claims, each numerical value presented herein is not to be considered limiting in any regard.

When the word substantially is used herein to describe a geometric shape, it means a shape having all of its dimensions within a particular percentage, e.g., 1%, 2%, 5%, 10%, 25%, 35%, of a perfect geometric version of the shape.

The terms and expressions employed herein are used as terms and expressions of description and not of limitation and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. The structural features and functions of the various embodiments may be arranged in various combinations and permutations, and all are considered to be within the scope of the disclosed invention. Unless otherwise necessitated, recited steps in the various methods may be performed in any order and certain steps may be performed substantially simultaneously. Accordingly, the described embodiments are to be considered in all respects as only illustrative and not restrictive. Furthermore, the configurations described herein are intended as illustrative and in no way limiting. Similarly, although physical explanations have been provided for explanatory purposes, there is no intent to be bound by any particular theory or mechanism, or to limit the claims in accordance therewith.

What is claimed is:

1. A pump assembly comprising:
a pump housing adapted to be placed in a pump well and to contain a pumping unit;
a fixed filter screen mounted inside the pump housing; and
a brush mounted inside the pump housing adjacent to the filter screen, wherein the brush is attached to a weighted component and adapted to be moved by a gravitational force to translate along a surface of the filter screen upon removal of the pump housing from the pump well, wherein said removal is in an upwards direction that allows the gravitational force to act on the weighted component such that the weighted component moves the attached brush along the surface of the filter screen.

2. The pump assembly of claim 1, wherein the pump housing has a shape selected from the group consisting of cylindrical, rectangular, and sectorial.

3. The pump assembly of claim 2, wherein the pump housing is cylindrical.

4. The pump assembly of claim 1, wherein the fixed filter screen is cylindrical.

5. The pump assembly of claim 4, wherein the brush is cylindrical.

6. The pump assembly of claim 1, wherein the brush is nested within the filter screen.

7. The pump assembly of claim 6, wherein the brush is arranged concentrically with the filter screen.

8. The pump assembly of claim 5, wherein the brush is adapted to be moved axially in a longitudinal direction along the surface of the filter screen.

9. The pump assembly of claim 1, wherein the brush is further adapted to rotate while in contact with the filter screen.

10. A pump assembly comprising:
a pump housing adapted to contain a pumping unit;
a substantially planar fixed filter screen mounted inside the pump housing; and
a manually-operated brush mounted adjacent the filter screen, wherein the brush is adapted to rotate while in contact with the filter screen and with an axis of rotation perpendicular to a plane defined by the filter screen, and wherein the brush is further adapted to translate parallel to the plane defined by the filter screen.

11. The pump assembly of claim 10, wherein the pump housing has a shape selected from the group consisting of cylindrical, rectangular, and sectorial.

12. The pump assembly of claim 11, wherein the pump housing is cylindrical.

13. The pump assembly of claim 10, wherein the fixed filter screen is at least one of circular and disc-shaped.

14. The pump assembly of claim 13, wherein the filter screen comprises an exposed surface and the brush is adapted to contact at least 90% of the exposed surface during rotation.

15. The pump assembly of claim 10, wherein the manually-operated brush is adapted to rotate within a circumferential track formed by the pump housing.

16. A pump assembly comprising:
a pump housing adapted to contain a pumping unit;
a substantially semi-cylindrical fixed filter screen mounted inside the pump housing; and
a manually-operated brush nested with the filter screen, wherein the brush is adapted to rotate while in contact with the filter screen and with an axis of rotation aligned with a longitudinal axis of the filter screen.

17. The pump assembly of claim 16, wherein the pump housing has a shape selected from the group consisting of cylindrical, rectangular, and sectorial.

* * * * *